July 3, 1923.
F. A. MACKINNON ET AL
COUPLER FOR RAILWAY AND LIKE VEHICLES
Filed June 24, 1921    5 Sheets-Sheet 2
1,460,974
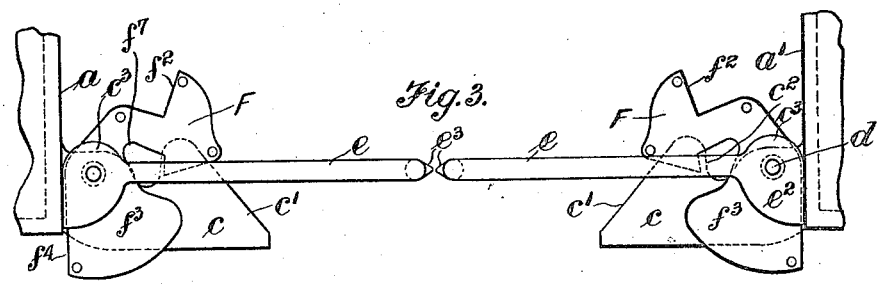
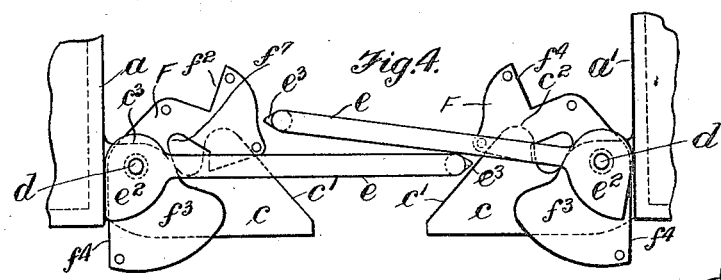
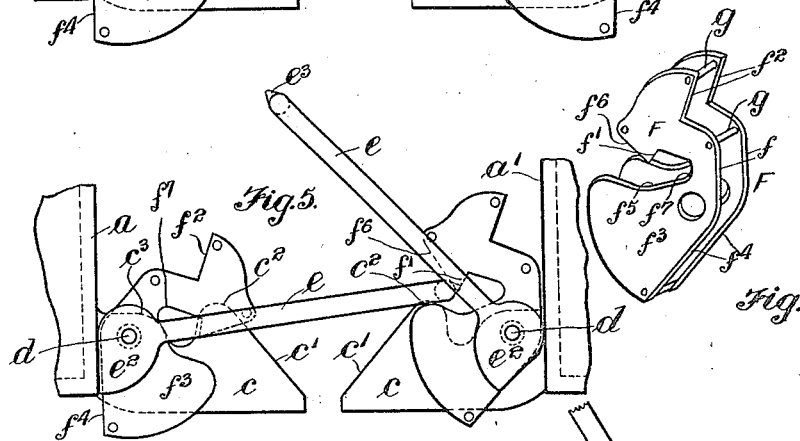
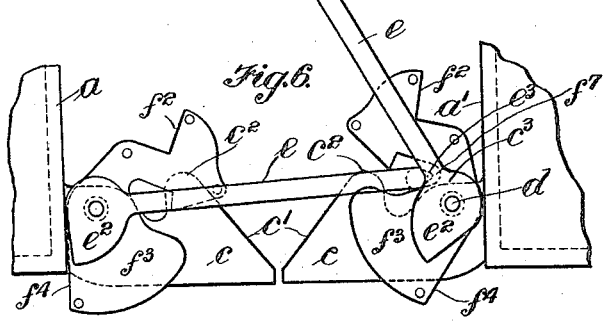
INVENTORS
FREDERIC A. MACKINNON
JOHN HAMPSON
BY
ATTORNEYS

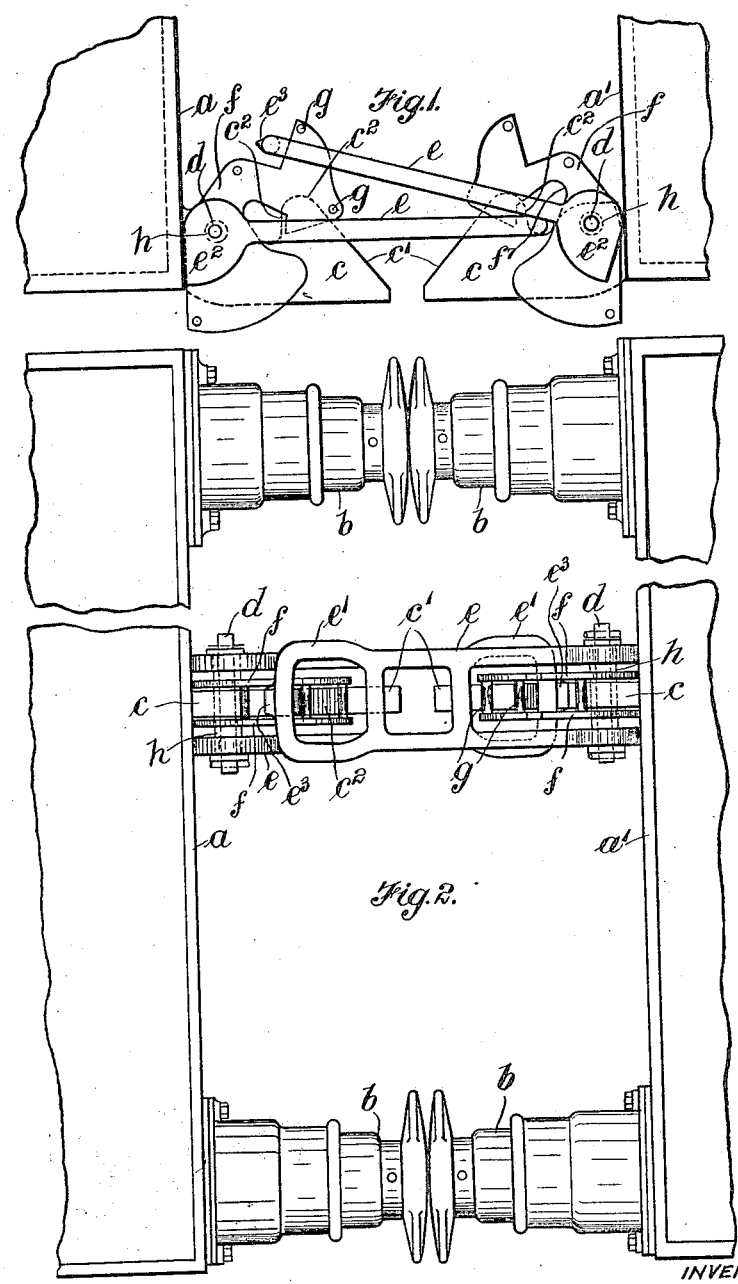

INVENTORS
FREDERIC A. MACKINNON
JOHN HAMPSON
BY
ATTORNEYS

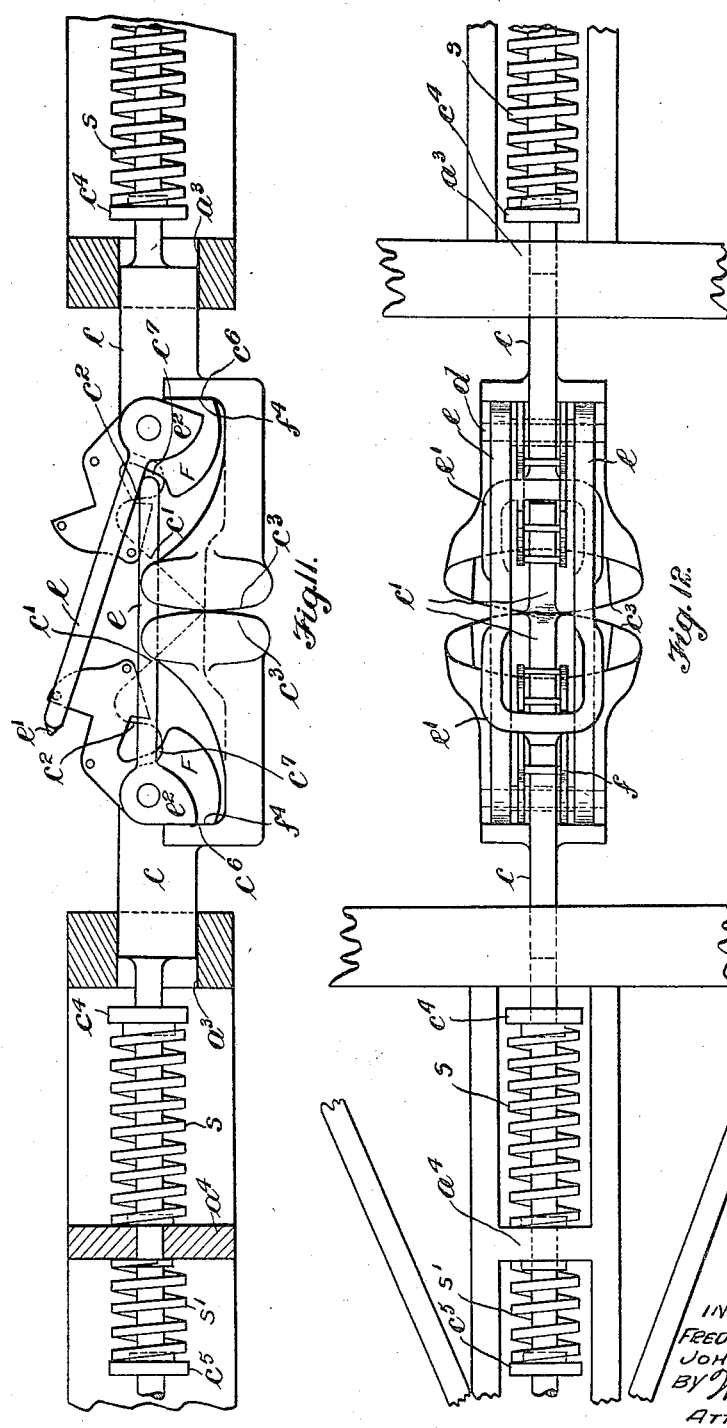

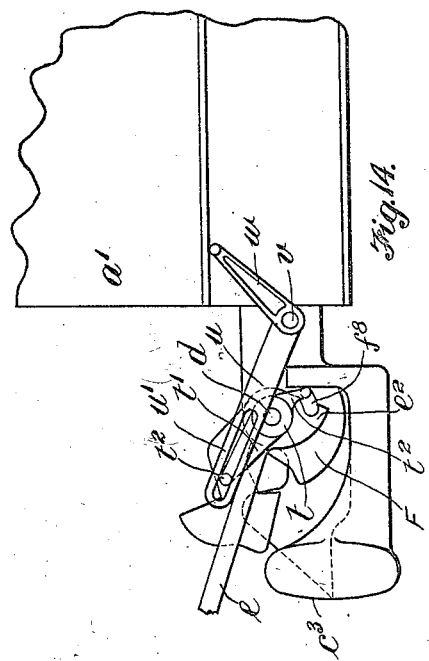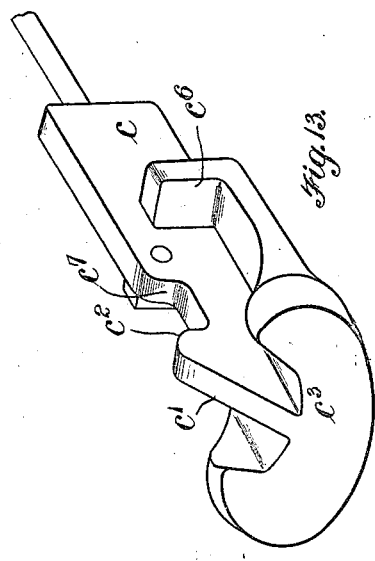

Patented July 3, 1923.

1,460,974

UNITED STATES PATENT OFFICE.

FREDERIC A. MacKINNON AND JOHN HAMPSON, OF LONDON, ENGLAND.

COUPLER FOR RAILWAY AND LIKE VEHICLES.

Application filed June 24, 1921. Serial No. 480,045.

*To all whom it may concern:*

Be it known that we, FREDERIC ALEXANDER MACKINNON and JOHN HAMPSON, both subjects of the King of Great Britain, and both residents of London, England, have invented certain new and useful Improvements in Couplers for Railway and like Vehicles, of which the following is a specification.

This invention relates to couplings for railway and the like vehicles of the type in which on two vehicles being brought together, the shackle of one vehicle is automatically guided into engagement with a hook on the other vehicle, whereby the two vehicles are automatically coupled together.

With vehicle couplings of this type it has been proposed to provide each vehicle with a pivoted loop or shackle each of which is brought into engagement with a hook on the adjacent vehicle, the shackles being in some cases mounted on central buffers. In some cases the shackle of an adjacent vehicle is retained in engagement with the draw bar hook by a hook or shield also having an operative surface adapted when the hook or shield is rotated to move the shackle out of engagement with said hook to effect uncoupling.

According to the general principle of our invention we provide the draw hook with a pivoted member having a lower hook adapted to take over a shackle of an adjacent vehicle when said shackle is in engagement with said draw hook, and an upper hook adapted to engage a shackle of a neighbouring vehicle.

In order that the invention may be more clearly understood, we will now describe one typical method of applying the same to a railway wagon.

The wagon is provided, as previously stated, with the ordinary central draw-bar or draw hook which in this case is furnished on the inside with a substantially vertical portion.

Behind the forward portion of the draw-bar is a pivotally mounted hook which has a downwardly turned portion adapted to engage over the shackle of the neighbouring coupled truck, and lock the same in the draw bar, as hereinafter described.

Rigidly connected to the pivotally mounted hook just mentioned is a plate of particular construction having in the preferred case a plurality of operative surfaces for the purposes hereinafter more fully explained.

Extending from the side of the vehicle and supported in suitable bearings is a transverse rod, provided with an operating handle at the side of the vehicle, and furnished with a cranked portion which is adapted to co-operate with a surface on the plate in connection with the swinging locking hook, in such a way that when the handle is rocked over, the locking hook is raised in order to enable the shackle of the opposite truck to be released.

The plate in connection with the locking hook is also provided with a surface, so shaped that when the plate and the hook are rocked upwards, this surface raises the loop or shackle of the opposite truck out of engagement with the drawhook.

Pivotally mounted in connection with the device and on each side of the drawhook are the ends of the loop or shackle intended to be engaged with the drawhook of the opposite vehicle, and the construction is such that this loop or shackle can only drop to a position in which it is substantially horizontal, so that it comes into the correct position for automatic coupling, when two trucks or vehicles are brought together.

The forward nose of each of the hooks is so shaped as to cause one or the other of the loops or shackles to be deflected upwards and thus enable them to drop into engagement with the hook and additional means may be provided for ensuring that two loops or shackles on opposite vehicles cannot come into contact in such a manner as to cause breakage.

In one mehtod of practical construction, we provide a plate on each side of the locking hook and we provide a transverse rod extending to each side of the vehicle, so that the pivoted locking hook may be operated from an independent handle at either side of the vehicle.

As an alternative, the swinging hook may be provided with only one plate and this plate may be operated from a cranked arm or the like attached to a transverse spindle provided with a handle at each side of the vehicle.

In some cases one or both of the opposite loops or shackles may be provided with a roller or the like, so that if in the process of coupling, the loops or shackles come into contact one of them will be deflected upwards or pushed out of the way and no damage or breakage will take place.

We prefer to use, in connection with the operating handle for operating the uncoupling, means for locking the apparatus in the coupled position.

This may consist of a pivotally mounted device at the side of the vehicle, the said device being provided with a grooved or channeled portion along which the operating handle slides. Suitably located in the groove is a hole or recess into which the end of the handle engages, the position of the device being then that in which the swinging locking hook is in the disengaged position. The mechanism may be instantly released by the shunter or other official by simply swinging the device round its pivot thus disengaging the handle and allowing the swinging hook to drop back into its position for automatic engagement.

In order that the invention may be readily understood reference is made to the accompanying drawings in which—

Fig. 1 is a side view of the automatic coupling, in coupled position.

Fig. 2 is a plan view of Fig. 1.

Figs. 3, 4, 5 and 6 show the parts of the coupling in their relative positions during automatic coupling.

Fig. 7 is a perspective view of the pivoted locking hook.

Figs. 11 and 12 are side views and plan respectively showing the vehicles coupled together, the draw bars being constructed to form buffers.

Fig. 13 is a perspective view of the outer end of one of the draw bars shown in Figs. 11 and 12.

Fig. 14 shows a simple method for effecting uncoupling.

Figure 8:
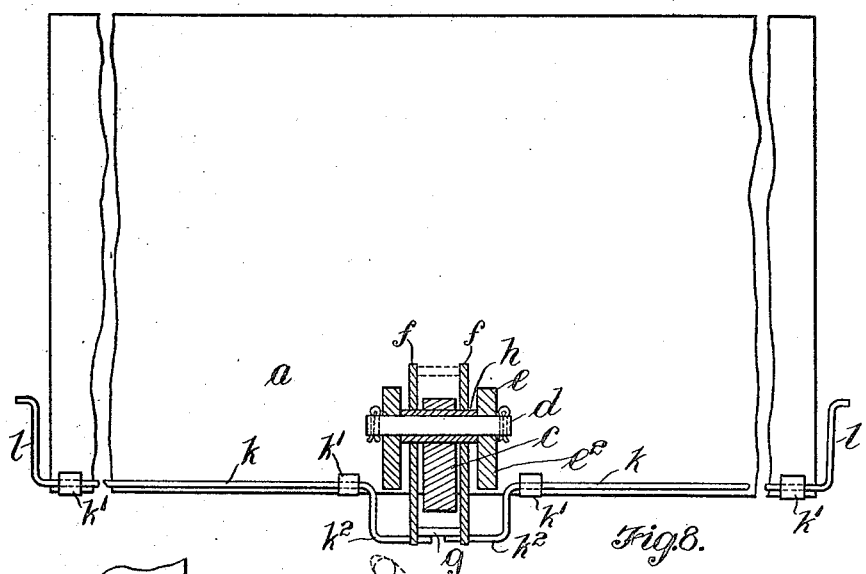
Fig. 8 is a vertical section taken on the line 8—8, Fig. 1.

In Figs. 1 to 10 of the drawings, the adjacent ends of the railway carriages, wagons, trucks or the like are indicated at $a$, $a^1$, each being provided with the usual buffers $b$, $b$, which may be of the usual well known construction.

$c$, $c$, are the hooked draw-bars or the like, which are rigidly or substantially rigidly connected centrally to the ends of the wagons in the usual manner. The hooked portion of each of these bars is formed with an outer inclined surface $c^1$, whilst the hook proper is preferably formed with a substantially vertical inner face, as shown at $c^2$. Between the hook proper and the rear of the wagon the draw bar is provided with a perforation to receive a bolt or the like $d$ on which the usual loop or shackle $e$ is rotatably mounted. The loop or shackle may be formed in one or more parts, its outer end constituting a loop $e^1$ whilst the inner forked ends are provided or formed with a segment shaped plate $e^2$ which when the shackle is in a substantially horizontal position, Fig. 2 abuts against the rear surface of the wagon, or a bearing plate secured thereto.

Pivotally mounted on the bolt $d$ is a locking hook F of particular construction, shown separately at Fig. 7, and furnished with a plurality of operating surfaces for purposes hereinafter described. This device is preferably formed of two flat plates, $f$ $f$ suitably spaced apart and secured together by bolts $g$, the distance between the plates being such as to permit of free movement of the device about its pivot, the plates being located on each side of the hooked draw-bar $c$.

The locking hooks F are adapted to oscillate freely about the axis of their bolts $d$ and are preferably mounted on a tubular bearing piece $h$, the ends of which extend beyond the outer surfaces of the plates $f$ $f$ and constitute a distance piece between the forked end of the shackle $e$, the bolt $d$ passing through the tubular member $h$ and the shackle and being secured by split pins or in any other suitable manner.

The locking or coupling hook F is formed of particular construction inasmuch as the outer surfaces are shaped or formed to effect varying operations or movements with respect to the shackle $e$ of an adjacent waggon with which coupling is to be effected.

The upper portion of the locking hook is formed with a double hook the lower member $f^1$ of which normally coincides with or approximately coincides with the vertical inner face $c^2$ of the draw-bar $c$ on which it is mounted (see Fig. 3) whilst the upper member $f^2$ normally projects upwardly and serves to co-operate with the end of the shackle of the adjacent waggon to form a double lock as hereinafter described.

The lower portion of the locking hook is substantially segment shaped as shown at $f^3$ its rear face $f^4$ normally abutting against the rear face of the waggon, as shown in Fig. 3. The upper front face of the segment shaped portion $f^3$ is also formed as an inclined surface at $f^5$ and serves to disengage the end of the shackle $e$ of the adjacent waggon, when the apparatus is operated for uncoupling.

Figure 9:
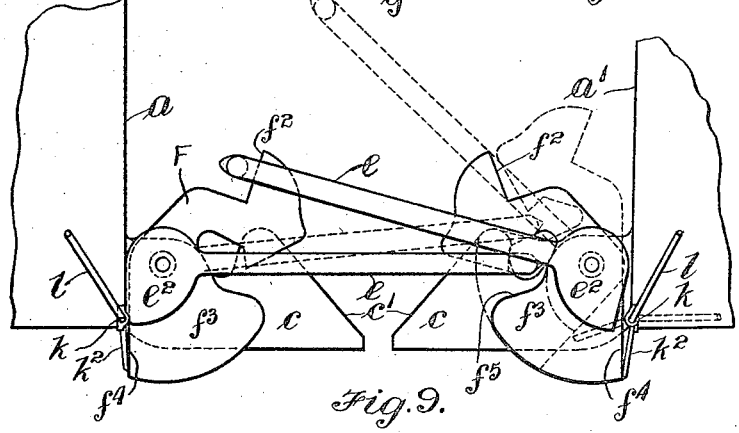
Fig. 9 shows a method of uncoupling.

In order to enable the uncoupling to be effected the end of the waggon is provided on one or both sides with a transverse rod $k$, Figs. 8 and 9, provided with an operating handle $l$. The rod $k$ is supported in suitable bearings $k^1$ and is cranked at $k^2$ at its inner end to engage the rear surface $f^4$ of the locking hook F so that when the handle $l$ is operated the locking hook F is rotated about its pivot the segmental portion $f^3$ being raised in order to enable the shackle of the opposite truck to be released.

The operation is as follows—

Normally the coupling devices of the waggons are in the relative position shown in Fig. 3 and in the following description of the operation it is to be assumed that the waggon $a^1$ is being shunted or moved towards the waggon $a$ to effect coupling.

The outer ends of the loops or shackles $e$ are each formed with an inclined or tapering tongue or lug $e^3$ and when the lugs of the shackles of the waggons, $a$ $a^1$ meet, one or the other is deflected upwardly as will be readily understood.

In the drawings it is assumed that on the waggon $a^1$ approaching the waggon $a$, its shackle $e$ is deflected upwardly. In the position shown at Fig. 4, it will be seen that the end of the shackle $e$ of the waggon $a$ has just reached the inclined surface $c^1$ of the waggon $a^1$ and begins to ride up this surface towards the top of the hook $c^2$. In so doing the outer curved end of the loop proper $e^1$ engages the under face of the forked ends of the opposite shackle $e$ and causes the latter to be rotated about the bolt $d$ of the waggon $a^1$ to the position shown in Fig. 5 and also to engage the front face $f^6$ of the lower hook $f^1$ thereby rotating the locking hook F about its pivot. On the loop $e^1$ of the shackle attached to the waggon $a$ passing over the top of the hook $c^2$, it falls into engagement therewith, thereby releasing the shackle of the waggon $a^1$ which also falls over the upper hook $f^2$ of the locking hook F of the waggon $a$ as shown in Fig. 1, the locking hook F of the wagon $a^1$ falling back to its normal position in which the lower hook passes behind the loop $e^1$ of the shackle of waggon $a$. The two waggons are now securely coupled together, a double lock being effected between the shackle $e$ of the waggon $a$ and the draw bar of the adjacent waggon $a^1$ and between shackle $e$ of waggon $a^1$ and the upper hook $f^2$ of the member F of the wagon $a$. The operation would be substantially the same if the shackle $e$ of waggon $a$ were deflected upwardly, the position of the double lock in this case being reversed.

In some cases during shunting operations, it very often happens that the impact of one waggon against another is sufficient to cause the buffers to telescope to the extent of their maximum stroke and in order to prevent any strain of impact being transmitted to the coupling, the draw bars $c$ and the locking hook are shaped in such a manner that the end of the shackle of the adjacent waggon is guided so as to prevent any direct end to end engagement of the parts. For this purpose the upper surface of the drawbars $c$ is curved upwardly and rearwardly at $c^3$ towards the waggon, whilst the rear of the hook $f^1$ is cut away as shown at $f^7$. Fig. 6 shows the position of the various parts of the coupling, when the buffers of the waggons $a$ and $a^1$ have been compressed to their maximum extent. It will be seen that the looped end $e^3$ of the shackle $e$ of waggon $a$ has moved past the hook $c^2$ of the draw bar $c$ of waggon $a^1$, whilst the extreme end of said shackle has moved the shackle $e$ of the adjacent waggon to almost a vertical position, the locking hook F of waggon $a^1$ being also rotated rearwardly. By this means as will be seen at Fig. 6, the end of the shackle of the waggon $a$ rides up the surface $f^5$ of the member F and enters the cut away portion $f^7$, so that no strain is imparted to any portion of the coupling.

The method of effecting uncoupling is shown in Fig. 9 the operating lever $l$ of the waggon $a^1$ is operated so that its cranked inner end engages the rear face $f^4$ of the locking hook F, the parts assuming the positions indicated by dotted lines. During its movement to this position the curved face $f^5$ engages the end of the shackle of waggon $a$ and raises the same out of engagement with the hook of the draw-bar $c$. Simultaneously the end of said shackle engages beneath the shackle of the waggon $a^1$ whereby the same is moved upwardly (dotted lines) out of engagement with the upper hook $f^2$ of the member F of waggon $a$ so that on the waggons being separated by the buffers, or by drawing one waggon away from another, uncoupling is effected.

Figure 10:
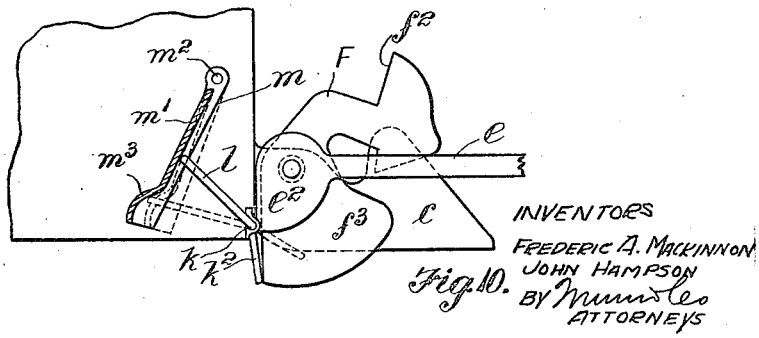
Fig. 10 shows a method by means of which the parts of the coupling may be retained in the disengaged position.

If desired, means may be employed for retaining the operating lever $l$ in the position in which the waggons are uncoupled. One simple device by means of which this may be effected is shown in Fig. 10. The device comprises a bar or the like $m$, which is grooved or channelled at $m^1$ on the side facing the operating lever $l$. The bar is pivoted at $m^2$ to the side of the waggon and normally tends to rotate, by its own weight, towards the end thereof. When the operating handle is rotated to the position shown in dotted lines, its outer end engages a recess or aperture $m^3$ on the channelled bar $m$. By this means the locking hook F is maintained in the position in which the shackles of the vehicles are disengaged from their hooks as previously described. The locking or retaining bar $m$ may be instantly released by the shunter or other official by simply swinging the rod $m$ about its pivot thus disengaging the handle $l$ and the swinging hook F falls back to its normal position under its own weight, thus bringing the parts back to position for automatic engagement.

Referring now to the construction shown at Figs. 11, 12, 13 and 14, instead of providing the vehicles $a$, $a^1$ with the ordinary buffers on each side of the coupling as in the construction previously described, the draw-bars $c$ $c$ are mounted slidably on the undercarriage of the vehicle. Suitable buffering springs being provided to take up the impact when the two vehicles come violently into contact with one another and take the pull during hauling.

In the construction shown, the forward end of the draw-bar is shaped at $c^3$ to form a suitable curved surface, the centre of the curved portion being cut away to permit of the shackle $e$ moving to the horizontal position and to permit the end $e^1$ of the shackle of the opposite vehicle to ride up the inclined surface $c^1$ in order to engage with the hook $c^2$. The rear end of the buffer is mounted slidably in suitable guides $a^3$ and $a^4$ on the undercarriage of the vehicle, and is provided with a buffing spring $s$ engaging the guide $a^4$ at one end and a collar or flange $c^4$ at its opposite end, so that the draw bar is capable of sliding movement inwardly from the end of the vehicle to a limited extent, against the tension of the spring $s$. On the opposite side of the fixed guide $a^4$ is a second spring $s^1$ mounted between said guide and a collar or flange $c^5$ fixed to the rear portion of the draw bar. The spring $s^1$ is arranged to take up any strains produced during a pull on the coupling, so that the draw bar is capable of longitudinal movement in both directions from its normal position, as determined by the size and strength of the respective springs $s$ and $s^1$.

In order to maintain the shackle $e$ of each vehicle in a substantially horizontal position ready for automatic coupling, the rear end of the hook portion of the draw bar $c$ is formed with lugs $c^6$ on opposite sides against which the rear face $f^4$ of the locking hook F and the segment shaped plate $e^2$ of the shackle $e$ abut when these members are in their normal position. The shape of the hook portion of the draw bar may also preferably be modified to give additional clearance, as shown at $c^7$ to ensure that no strain is exerted upon any portion of the coupling when two vehicles are brought violently together.

As will be seen the coupling is in no way affected by the compression of extension of the buffers and further enables the vehicles to be coupled automatically or uncoupled manually when the buffers are either compressed or extended.

The movements of the shackle of one of the vehicles to effect uncoupling may be effected in any suitable manner, and if operated from one side of the body of the vehicle, provision must be made to permit movements of the buffers and the couplings carried thereby.

One simple method of effecting uncoupling when the coupling means are combined with a buffing draw-bar is shown in Fig. 14. The pivot pin $d$ on which the locking hook F and the shackle $e$ is mounted, is extended on one or both sides and on said extension is keyed a two armed lever $t$, one arm $t^1$ of which preferably carries a roller $t^2$ engaging a longitudinal slot $u^1$ in a lever $u$ mounted on a shaft $v$ extending from side to side of the vehicle. The opposite arm $t^3$ of the two armed lever is provided with a projection extending inwardly and engaging a slot or recess $f^3$ in the rear face $f^4$ of the locking hook F. The shaft $v$ is provided at one or both ends with an operating lever $w$ by means of which said shaft may be rotated from either side of the vehicle. By this means, uncoupling of two vehicles may be effected, whether the buffing draw bars are compressed or extended. When the buffer is compressed, the slotted lever $u$ is partially rotated around the axis of the shaft $v$ but no corresponding movement is imparted to the locking hook F.

It is evident that the details of construction may be varied considerably without departing from the principle of our invention.

For instance in place of operating the disengaging and engaging hook from a cranked arm indirectly it may in some cases be positively operated directly from a handle at the side of the vehicle.

With devices of the kind described, the important advantage is that it is only necessary to bring the vehicles to which they are fitted into position for coupling whereupon the coupling is automatically effected, owing to the fact that one or other of the projecting loops or shackles rides up the nose of the hook upon the opposite vehicle, drops over same and is then automatically locked by the hook upon the safety device in connection with the draw-bar. Uncoupling is effected with equal facility by operating the handle on one or other side of the vehicle, thus raising the safety hook out of position and at the same time lifting the loop or shackle out of engagement with the drawbar, whereupon under the action of the spring buffers or otherwise, the vehicles become completely detached.

The preferred construction in which the plates forming the locking hook or hooks are formed with inclined or cam-like surfaces which push against the loop or shackle and automatically raise it out of the draw hook whilst raising the locking hook is of particular advantage as it excludes all possibility of the hooks catching in the process of uncoupling.

Another method of effecting the desired movement of the locking hook in order to effect uncoupling consists in extending the pivot pin about which the locking hook and the shackle oscillate, and to provide the extension with a tubular member having a tongue or projection at one end adapted to engage the rear face of said hook. The tubular member is preferably formed with an elongated circumferential slot with which a stud fixed to the pivot pin engages. The opposite or outer end of the pivot pin is provided with a suitable operating lever located towards the side of the vehicle.

By this means on rotation of the pivot pin, the tubular member is also rotated its tongue engaging the locking hook to effect the desired movement thereof.

We claim:

1. In an automatic coupling for railway and like vehicles, the combination with the draw hook and a pivoted shackle of a pivoted member provided with a lower hook adapted to engage a shackle of an adjacent vehicle when said last mentioned shackle is in engagement with said draw hook, and with an upper hook, adapted to engage the shackle of an adjacent vehicle.

2. A coupling device for railway and other vehicles, comprising a draw bar provided with a hook, mounted on each vehicle, a pivoted shackle on each of said draw bars, and a pivoted member on each of said draw bars, each of said pivoted members having a lower hook and an upper hook, the lower hook of the pivoted member on one vehicle engaging the shackle of the second vehicle whilst the upper hook of the pivoted member on the second vehicle engages at the same time with the shackle of the first vehicle.

3. A coupling device for railway and the like vehicles comprising two vehicles, each having a draw bar provided with a hook, a pivoted shackle and a pivoted hook member and means on each vehicle for guiding the shackle of one vehicle into engagement with the draw bar hook of the second vehicle and for moving the shackle of the second vehicle into a position to engage the upper hook of the pivoted hook member of the first vehicle, for the purposes set forth.

4. In an automatic coupling for railway and the like vehicles the combination with a draw bar and a pivoted shackle of a pivoted member provided with a lower hook and an upper hook, said member consisting of two relatively flat plates spaced apart to receive the draw bar between them, the shackle and pivoted member being mounted to oscillate about a common pivot extending through the draw bar, for the purposes set forth.

5. A coupling device for railway and other vehicles, comprising a draw bar provided with a hook, mounted on each vehicle, a pivoted shackle on each of said draw bars, and a pivoted member on each of said draw bars, each of said pivoted members having a lower hook and an upper hook, the lower hook of the pivoted member on one vehicle engaging the shackle of the second vehicle whilst the upper hook of the pivoted member on the second vehicle engages at the same time with the shackle of the first vehicle, and means for oscillating the pivoted member on one vehicle to disengage the shackles from their respective hooks, for the purposes set forth.

In testimony whereof we have hereunto subscribed our names.

Dated this 8th day of June, 1921.

FREDERIC ALEXANDER MacKINNON.
JOHN HAMPSON.